United States Patent [19]

Schwerdtner et al.

[11] Patent Number: 4,573,551

[45] Date of Patent: Mar. 4, 1986

[54] EXHAUST GAS DUCT FOR GAS TURBINES

[75] Inventors: Otto v. Schwerdtner; Klaus Dinstuhl, both of Mülheim, Fed. Rep. of Germany

[73] Assignee: Kraftwerk Union Aktiengesellschaft, Mulheim an der Ruhr, Fed. Rep. of Germany

[21] Appl. No.: 468,556

[22] Filed: Feb. 22, 1983

[30] Foreign Application Priority Data

Feb. 24, 1982 [DE] Fed. Rep. of Germany ....... 3206626

[51] Int. Cl.[4] ............ B64F 1/26

[52] U.S. Cl. ............ 181/218

[58] Field of Search ............ 181/218, 217, 264, 205, 181/240, 268

[56] References Cited

U.S. PATENT DOCUMENTS

| | | | |
|---|---|---|---|
| 3,187,835 | 6/1965 | Smith | 181/217 |
| 3,227,240 | 1/1966 | Lee et al. | 181/217 |
| 3,415,337 | 12/1968 | Karasievich | 181/218 |
| 3,715,009 | 2/1973 | Smith et al. | 181/218 |

FOREIGN PATENT DOCUMENTS

| | | |
|---|---|---|
| 2266029 | 10/1975 | France . |
| 1339526 | 12/1973 | United Kingdom . |

*Primary Examiner*—L. T. Hix
*Assistant Examiner*—Brian W. Brown
*Attorney, Agent, or Firm*—Herbert L. Lerner; Laurence A. Greenberg

[57] ABSTRACT

Exhaust gas duct for gas turbines, including an axial discharge housing, a deflection piece connected downstream of the axial discharge housing in exhaust gas flow direction, the deflection piece having a substantially horizontal first diffusor section and a substantially vertical second diffusor section, the first and second diffusor sections each having a respective inclined edge facing each other, a grid disposed in the deflection piece for redirecting exhaust gas flow into the vertical direction, a substantially vertical exhaust gas chimney disposed downstream of the deflection piece in exhaust gas flow direction, and a noise suppressor disposed in the deflection piece.

2 Claims, 4 Drawing Figures

EXHAUST GAS DUCT FOR GAS TURBINES

Figure 2:
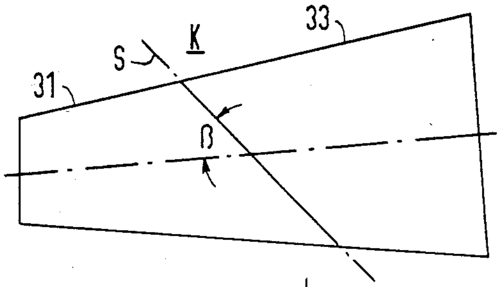

The invention relates to an exhaust gas duct for gas turbines, having an axial discharge housing, a deflection piece disposed downstream of the axial discharge housing, a grid disposed in the deflection piece for redirecting the exhaust gas flow into the vertical direction, and a vertical exhaust gas chimney being disposed downstream of the deflection piece and containing a noise suppressor.

Stationary gas turbines with a high power rating usually have an axial discharge housing which is connected to an exhaust gas chimney through an exhaust gas line. The velocity of the exhaust gas flow, which at the outlet of the turbine is of the order of 100 m/s, must be slowed down in the exhaust gas line to about 50 m/s, because otherwise the sound absorber which is required for reducing noise pollution, can be destroyed. In addition, such a reduction of the flow velocity is necessary for reducing outlet losses and for avoiding excessive noise at the mouth of the exhaust gas chimney.

However, when using justifiable dimensions for the exhaust gas line, a reduction of the flow velocity with low loss raises problems, since the very large volume flows necessitate large flow cross sections, and a redirection of the exhaust gas flow from the axial to the vertical direction is additionally necessary. In conventional exhaust gas ducts for gas turbines, the noise suppressor is either disposed axially downstream of the gas turbine or is inserted vertically into the exhaust gas chimney. In the first case, a very long axial transition piece is necessary for lowering the flow velocity to an extent which benefits the noise suppressor. If this space is not available, flow resistances must be built-in for lowering and equalizing the velocity, which generate additional losses. If the noise suppressor is disposed vertically in the exhaust gas chimney, new flow irregularities, velocity peaks and turbulence are generated which can constitute a danger to the noise suppressor. To protect the noise suppressor, built-in components are therefore used for equalizing the flow and as deflection aids, or the noise suppressor is installed high in the exhaust gas chimney. However, the corresponding prior art structures have high losses and can only be made at relatively high cost.

It is accordingly an object of the invention to provide an exhaust gas duct for gas turbines, which overcomes the hereinafore-mentioned disadvantages of the heretofore-known devices of this general type, and in which the exhaust gas line permits a low-loss decrease of the flow velocity while requiring little space.

With the foregoing and other objects in view there is provided, in accordance with the invention, an exhaust gas duct for gas turbines, comprising an axial discharge housing, a deflective piece connected downstream of the axial discharge housing in exhaust gas flow direction, the deflection piece having a substantially horizontal first diffusor section and a substantially vertical second diffusor section, the first and second diffusor sections each having a respective inclined or mitered edge facing each other, a grid disposed in the deflection piece for redirecting exhaust gas flow into the vertical direction, a substantially vertical exhaust gas chimney disposed downstream of the deflection piece in exhaust gas flow direction, and a noise suppressor disposed in the deflection piece.

In the exhaust gas duct according to the invention, the entire exhaust gas line is thus formed by a redirection section which acts through a substantially horizontally oriented first diffusor section and a vertically oriented second diffusor section and therefore causes a low-loss lowering of the flow velocity, dispensing with transition and intermediate pieces. The prerequisites for a flow through the deflection section without separation and for the effectiveness of the vertically oriented second diffusor section is ensured by the grid which in this case is disposed in the deflection section, for the uniform deflection of the exhaust gas flow. The length of the sections of the first and the second diffusor can be chosen at will, so that the exhaust gas line can be adapted with little effort to the respective local space conditions.

In accordance with another feature of the invention, the first and second diffusor sections and the edges thereof are formed from a single circular conical diffusor having a single inclined or mitered cut formed therein. This makes extremely economical fabrication of the deflection section possible.

In accordance with a further feature of the invention, there is provided an intermediate piece having an elliptical cross section, the intermediate piece being disposed between the first and second diffusor sections and being welded to the edges thereof, the grid being disposed in the intermediate piece. The intermediate piece with the grid can be fabricated before it is welded to the two diffusor sections, which, in particular, facilitates the welding of the individual deflection baffles of the grid.

In accordance with a concomitant feature of the invention, the substantially horizontal first diffusor section is inclined relative to the horizontal for permitting installation of the deflection piece above the level of a floor.

Other features which are considered as characteristic for the invention are set forth in the appended claims.

Although the invention is illustrated and described herein as embodied in an exhaust gas duct for gas turbines, it is nevertheless not intended to be limited to the details shown, since various modifications and structural changes may be made therein without departing from the spirit of the invention and within the scope and range of equivalents of the claims.

Figure 3:
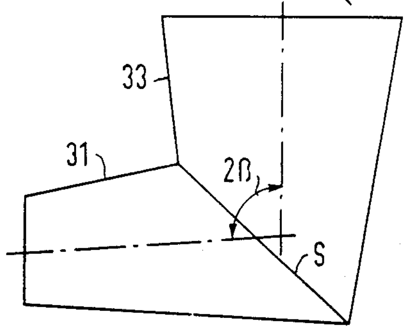
Figure 4:
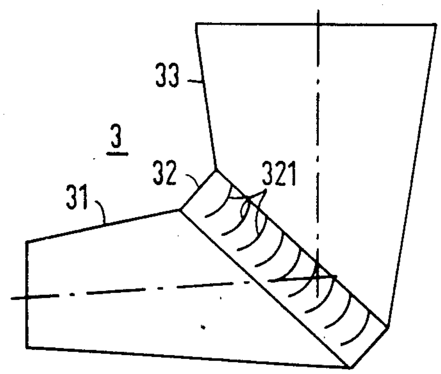
Figure 1:
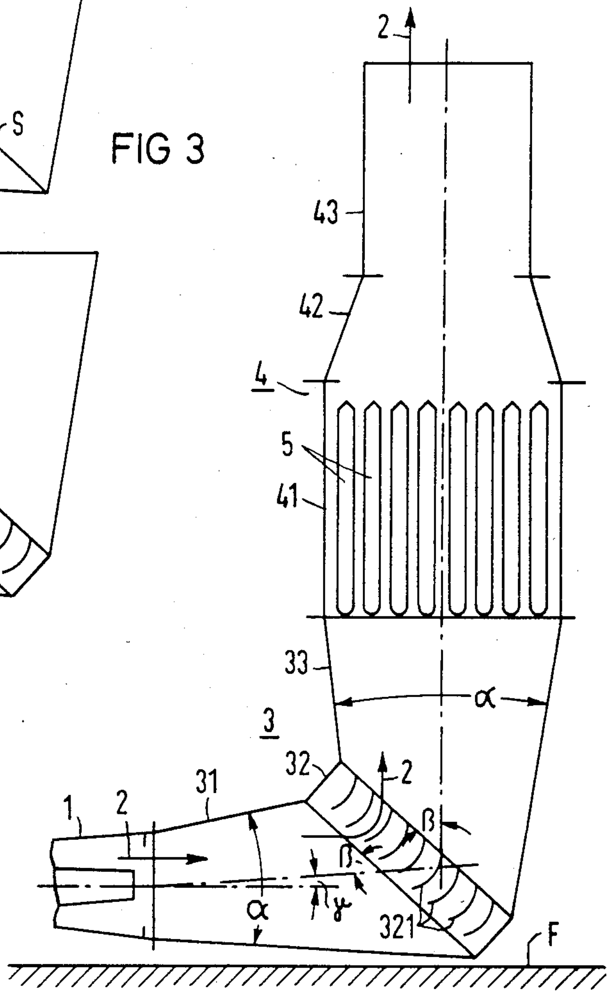

The construction and method of operation of the invention, however, together with additional objects and advantages thereof will be best understood from the following description of specific embodiments when read in connection with the accompanying drawings, in which:

FIG. 1 is a fragmentary, diagrammatic, longitudinal sectional view of the exhaust gas duct of a gas turbine with a deflection section which is constructed almost completely as a diffusor; and FIGS. 2 to 4 are longitudinal sectional views showing different stages in the fabrication of the deflection section.

Referring now to the figures of the drawing in detail, and first particularly to FIG. 1 thereof, it is seen that the exhaust gas canal begins with a partially illustrated axial discharge housing 1 of a gas turbine, from which the exhaust gas flow, indicated by arrows 2, emerges in the horizontal direction. The discharge housing 1 is followed by a first diffusor section 31 of a deflection piece designated overall with reference numeral 3. In the first diffusor section 31, the flare angle of which is designated with reference symbol $\alpha$, a low-loss slowdown of the exhaust gas flow is achieved. The first diffusor section 31 is directed slightly upwards to avoid the necessity of providing an installation below the floor level F. However, the deviation from the horizontal, designated by an angle $\gamma$, must be small because otherwise, a flow separation could already occur at the beginning of the first diffusor section 31.

The nearly horizontally oriented first diffusor section 31, the end of which is cut at an angle, is followed by an intermediate section 32. A grid 321 formed by a multiplicity of deflection baffles for deflecting the exhaust gas flow 2 into the vertical direction, is disposed in the intermediate section 32. The uniformity of the deflection of the exhaust gas flow 2 with minimal deflection losses is ensured by providing a sufficient number of deflection baffles for the grid 321.

The intermediate piece 32 with the grid 321 is then followed by a second diffusor section 33 of the deflection section 3, which begins with an angle section and is oriented vertically. In this second diffusor section 33, the flare angle $\alpha$ of which corresponds to the flare angle $\alpha$ of the first diffusor section 31, a further low-loss slowing down of the exhaust gas flow 2 is achieved.

The second diffusor section 33 is followed by a vertical exhaust gas chimney, which is designated with reference numeral 4 and is divided into a cylindrical noise suppressor section 41, a conical transition piece 42 and a cylindrical chimney part 43, as seen from the bottom up. A sound absorber 5 which is formed of a number of vertical plates serving as sound absorber elements, is disposed in the noise suppressor section 41.

The individual steps in the fabrication of the deflection section 3 may be seen in FIGS. 2 to 4. According to FIG. 2, initially a single circular cone diffusor K is divided by a miter cut S into the first diffusor section 31 and the second diffusor section 33. The miter angle is designated with reference symbol $\beta$. The miter cut S gives the two diffusor sections 31 and 33 inclined cross-sectional surfaces in the form of ellipses, which fit together according to FIG. 3 if the second diffusor section 33 is rotated about its axis by an angle of 180°. To complete the deflection piece 3, it is only required to weld the intermediate piece 32 with the grid 321 into the miter gap between the two diffusor sections 31 and 33.

The partial lengths of the two diffusor sections 31 and 33 can also be adapted to local conditions. Since the pressure recovery percentages, the flow separation criteria and overall pressure losses of circular cone diffusors are also known to be a function of the length and the flare angle, the dimensions of the exhaust gas section 3 can be calculated and optimized.

We claim:

1. Exhaust gas duct for gas turbines, comprising an axial discharge housing, a deflection piece connected to and downstream of said axial discharge housing in exhaust gas flow direction having a steadily increasing cross section in exhaust gas flow direction for reducing the flow velocity of the exhaust gas and the outlet losses of the gas turbine, said deflection piece having a substantially flow-horizontal first conical diffusor section and a substantially vertical second conical diffusor section for reducing the overall horizontal extent of the exhaust gas duct, said first and second diffusor sections being formed from a single circular conical diffusor having a single inclined cut formed therein, said first conical diffusor section having a downstream and with a first inclined edge, said second conical diffusor section having an upstream end with a second inclined edge facing said first inclined edge, a grid in the form of an intermediate piece with an elliptical cross section disposed in said deflection piece for reducing the flow velocity of the exhaust gas and the outlet losses of the gas turbine, said grid being disposed between said first and second conical diffusor sections and being welded to said first and second inclined edges for redirecting exhaust gas flow into the vertical direction and into said second conical diffusor section, a substantially vertical exhaust gas chimney disposed downstream of and connected to said second conical diffusor section in exhaust gas flow direction, and a noise suppressor disposed in said exhaust gas chimney being protected by the reduced flow velocity.

2. Exhaust gas duct according to claim 1, wherein the axis of said substantially horizontal first diffusor section is upwardly inclined relative to the horizontal for permitting installation of said deflection piece above the level of a floor.

* * * * *